INVENTORS
Julius J. Sabo
Howard E. Butler
BY John T. Marvin
Their Attorney

United States Patent Office 2,908,941
Patented Oct. 20, 1959

2,908,941

METHOD FOR MOLDING A BALL-LIKE ARTICLE

Julius J. Sabo and Howard E. Butler, Dayton, Ohio, assignors to General Motors Corporation, Detroit, Mich., a corporation of Delaware Application July 3, 1957, Serial No. 669,825

1 Claim. (Cl. 18—59)

This invention relates to a method for making solid articles of substantial volume molded from thermoplastic resins and the like.

Plastic materials of various compositions are particularly noted for their shrinkage during the cooling period of the molding operation. The problem of shrinkage is of considerable concern in the manufacture of solid articles of substantial mass such as door knobs, automobile gear shift levers and the like, which are provided with an opening for snugly and attachably receiving the end portion of a supporting lever or other shaft-like member. When such an article is molded by a conventional single step operation wherein the thermoplastic material is injected in a relatively hot plastic condition into a mold cavity of the shape of the article, having a mold core or mandrel of the shape of the desired opening or the shape of the end portion of the lever or supporting shaft-like member, the plastic material on cooling shrinks away from the top of the mold core in a manner similar to the formation of "pipe" in the molding of metal ingots with the result that the finished article has a deep void at the base of the support receiving opening. As a consequence, when the end portion of the article supporting member is positioned within the opening of the article, it does not "bottom" solidly in a predetermined position and may not firmly be secured in this position by convenient means as for example by screw threads.

Broadly, among the objects of the invention is to provide an article of the type described having an opening therein of predetermined dimensions adapted for snugly receiving the end of a support member and to provide a method of molding such an article wherein the above described difficulty is eliminated.

These and other objects are accomplished in a two-step molding operation wherein a first molding step produces a relatively thin inner core about a male mold member or mandrel representing the shape of the opening which is to snugly receive the end portion of a support member, which involves no appreciable shrinkage, and a second molding step involves molding a relatively thick layer about the inner core which represents the major portion of the article whereby a solid article is formed having an accurately dimensioned opening therein.

A particular object of the invention is to provide an inner core which is of a configuration and thickness such that no appreciable shrinkage is involved in the molding thereof and which will not melt in the vicinity of the radial portion thereof adjacent the end of the mold member during the second molding operation. To this end, the radial portion of the inner core adjacent the end of the mold member is made relatively thin and provided with a radially extending flange portion. Further, a radially extending portion of substantial mass is provided axially of the said radial portion of the core having at least the radial dimensions of the said radial portion spaced therefrom and connected thereto by a relatively thin neck portion. With this configuration, the core is formed about the male mold member without appreciable shrinkage since the core wall portions adjacent thereto are sufficiently thin to accomplish this result. However, when the hot plastic is injected about the core in the second molding operation, the flange portion thereof and the said axially spaced mass thereof are capable of conducting sufficient heat away from the radial core portion adjacent the male mold member to prevent a melting of this core portion and consequent shrinkage thereof away from the male mold member.

Further objects and advantages of the present invention will be apparent from the following description, reference being had to the accompanying drawings wherein a preferred embodiment of the invention is clearly shown.

The invention will now be described in terms of a spherical knob having an accurately dimensioned threaded opening therein for receiving a threaded end portion of a shaft-like support member as for example an automobile gear shift lever. However, it will be obvious that the invention is generally applicable to the molding of any article of substantial mass of various shapes which must have an accurately dimensioned opening therein.

Figure 1:
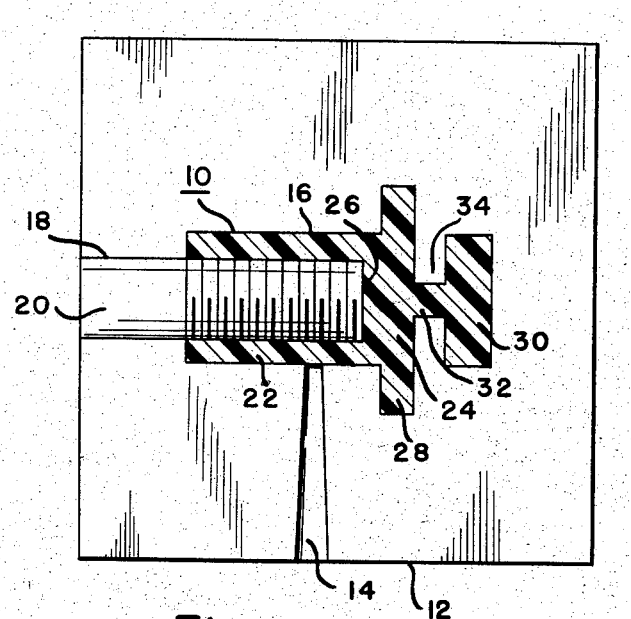
Fig. 1 is a cross-sectional view of a core taken along the inner face of identical complementary mold members embodying the present invention.

The invention involves a two-step molding operation. Referring to Fig. 1, the first step involves the molding of an inner core 10 within a more or less conventional injection mold apparatus consisting of identical half mold portions of which the lower half 12 is shown including a sprue portion 14, a cavity 16 and a cylindrical opening 18 into which is inserted a threaded male mold member 20 positioned and suitably secured in a predetermined location within the mold cavity. The core member 10 is molded by injecting a thermoplastic resin such as cellulose acetate butyrate at a pressure of about 3–5 tons per sq. in. of projected area in a relatively hot molten or plastic state through the sprue 14.

The core 10 consists of a tubular portion 22 surrounding the threaded axial portion of the male mold member 20 and a radial portion 24 adjacent the end 26 of the male mold member 20. Integrally attached to the radial portion 24 is a relatively thin radially extending flange 28, and axially spaced from the radial portion 24 is a relatively thin disc-like portion 30 connected thereto by means of a relatively thin neck portion 32 and extending radially to approximately the radial dimensions of the radial portion 24. It will be observed that except for the neck portion 32, the disc-like member 30 is separated from the radial portion 24 of the core by a relatively thin annular space 34. The tubular portion 22 and the radial portion 24 are of a thickness such that no appreciable shrinkage of these parts are involved in the molding of the core member. The neck portion 32 serves only to support the disc-like portion 30 in a predetermined spaced relation with respect to the radial portion 24 of the core and any suitable arrangement may be employed to accomplish this result.

Figure 2:
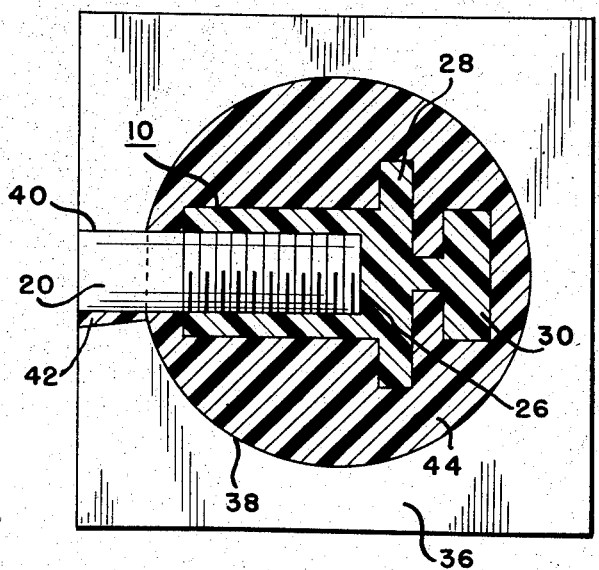
Fig. 2 is a cross-sectional view of a spherical member formed about the core in Fig. 1 taken at the inner face of identical complementary mold members.

As is illustrated in Fig. 2, the second molding operation involves a more or less conventional mold apparatus consisting of identical half mold portions of which the lower half 36 is shown including a spherical cavity 38, a cylindrical opening 40 for receiving the male mold member 20 of Fig. 1 and a sprue portion 42 adjacent the cylindrical opening 40. In the second molding operation, the male mold member 20 having the core 10 molded thereon is transferred to the mold 36 and suitably supported therein. Molten or flowable plastic is injected into the mold cavity through the sprue whereby a second layer 44 constituting the major portions of the finished article is molded about the core 10 to form a solid spherical knob having an accurately dimensioned opening therein corresponding to the shape of the mold member 20.

The shape of the core 10 is of critical importance in the formation of a solid article of the type described. The annular space 34 is relatively thin so that the heat of the relatively small amount of plastic material flowing therein is carried away sufficiently by the flange portion 28 and the mass 30 from the radial portion 24 of the core so that the radial portion 24 is not caused to melt and shrink away from the end 26 of the male mold member.

The exact dimensions of the mass 30, the flange portion 28 and the annual space 24 may readily be determined experimentally in the light of the cycle time of the molding operations, the type of plastic involved in molding and the size of the article to be molded. In molding an article of cellulose acetate butyrate involving injection pressures of about 3–5 tons per sq. in. of projected area, the core parts are preferably dimensioned so that in the second molding operation, the molding pressure may be released as soon as the plastic material has solidified at the mold wall surfaces at which time the outer core wall surfaces have softened sufficiently to cause a fusion between the mold core outer surfaces and the outer layer 44 without appreciable softening of the core walls so that a shrinkage of the core walls away from the male mold member is prevented. The resulting article is solid throughout and involves no appreciable shrinkage adjacent either the male mold member 20 or the male mold member 36. The presence of the core mass 50 appears to have the further beneficial result of providing plastic material at the point where a void would form in a single-step molding process.

The method of the present invention is applicable to a wide variety of plastic materials such as methylmethacrylate resins, polyethylene, cellulose acetate and the like which may be molded in a flowable or plastic state under the influence of heat.

It is to be understood that within minor limits all synthetic resin materials tend to shrink to some extent in all dimensions on cooling from a plastic state and in the aging thereof. In molding plastic articles of the present invention, the effect of this type of shrinkage is corrected for by proper dimensioning of the mold members in relation to the desired dimensions of the finished article to allow for the shrinkage.

While the embodiments of the present invention constitute a preferred form, it is to be understood that other forms might be adopted.

What is claimed is as follows:

In a method for molding a ball-like article of substantial volume having an opening therein, the steps comprising; inserting a metal mold member into a mold, injection molding a minor portion of the plastic required for the final article about said mold member for forming a relatively thin core about the mold member wherein said core includes an extension having an interlock thereon, cooling the core upon the mold member and removing the same from the mold, inserting the mold member with the core thereon into a second and larger mold cavity having the desired final configuration, injection molding the major portion of the plastic required for the completed article about said core for filling the mold and for interlocking with the core, removing the article and mold member from the mold after cooling, and finally removing the mold member from the article.

References Cited in the file of this patent

UNITED STATES PATENTS

| | | |
|---|---|---|
| 2,266,432 | Morin et al. | Dec. 16, 1941 |
| 2,607,957 | Danielson et al. | Aug. 26, 1952 |